Patented Mar. 11, 1930

1,749,976

UNITED STATES PATENT OFFICE

ROGER B. HILL, OF BERLIN, NEW HAMPSHIRE, ASSIGNOR TO BROWN COMPANY, OF BERLIN, NEW HAMPSHIRE, A CORPORATION OF MAINE

PROCESS OF REFINING EDIBLE OILS

No Drawing.  Application filed November 30, 1923. Serial No. 677,885.

This invention relates to the refinement of edible oils, and has for its object to provide certain improvements therein, whereby the free fatty acids and impurities are more effectively removed and the color of the oil improved, all with a minimum loss of neutral oil and without affecting harmfully the taste or the component pure glycerides of the natural oil.

In achieving the object of the invention, I may practice certain steps in sequence, but either may be employed without necessarily employing the other, depending more or less upon the character of the oil to be refined, as I will subsequently make clear.

Crude edible oils, even when derived from the same source, vary greatly in color, some being very dark. I have found that such oils, when treated with sulphuric acid of such strength as not to injure them, with gentle heating when desirable, are greatly improved as to color, the proportion of the sulphuric acid solution employed for the purpose depending upon the character of the oil. It has generally been regarded that mineral acids could not be employed for the refinement of edible oils, because, notwithstanding meticulous care exercised in subsequent washing operations, such mineral acids imparted an objectionable flavor to the refined oil (Vide Lewkowitsch, Vol. III, page 18, fifth edition, 1915). I have found that, while this may be true in the case of concentrated sulphuric acid, 66° Bé., sometimes used for decolorizing oils or fats for industrial purposes, and that mineral acids of such strengths cannot be used with oils intended for edible purposes, yet sulphuric acid up to 70% $H_2SO_4$ will not affect harmfully either the odor or taste of edible oils or fats if used in small quantities. When small amounts of the last-mentioned acid are employed, say from 0.05% to 0.15% by weight of the crude oil, the color of the oil or fat is remarkably improved and the edible character of the oil or its odor are unimpaired. When the acid is added to the oil, it immediately disperses therein, after which the oil is treated with lye sufficient in amount to neutralize the free fatty acids thereof and also the added sulphuric acid, and if desirable, a coagulant is then mixed with the oil for compacting the soap stock and permitting the separation of the refined neutral oil therefrom.

I have further discovered that, as a coagulating and purifying agent for removing the soap stock and other foreign bodies in suspension in the oil, certain earths, characterized by an alkaline earth or alkaline earth oxide content, possess properties which render them of the greatest value in performing their functions. Such earths are known as "bentonites" of which there are several, including "ardmorite", and are characterized by a high absorption value,—some when wetted having the property of absorbing more than three times their weight and seven times their volume of water. Some of them possess a relatively high decolorizing power, and their alkaline nature is such that by their use the acidity of the oil will not be increased and yet the alkalinity is not sufficiently strong to affect neutral glycerides.

In accordance with my process, I preferably employ powdered bentonite as a coagulating agent, after the treatment of the oil with lye, irrespective of whether the oil has been subjected to the preliminary mineral-acid decolorizing treatment, although I would have it understood that, when the oil has been given the preliminary acid treatment, I may employ any other coagulant instead of bentonite.

As one example of the manner of carrying out my process of refining edible oils and fats, the following is set forth:—To 5,000 pounds of crude peanut oil (having a free fatty acid content of, say, 1.5%) I add 5 pounds of 70% $H_2SO_4$ by weight. The mixture is agitated for about one-half hour at 25° C., after which I stir into the mass 2.858 pounds NaOH as 16° Bé. (10.97%) caustic solution, sufficient to neutralize the sulphuric acid, and 10.64 pounds NaOH as 16° Bé. caustic solution, sufficient to neutralize the free fatty acids. The total weight of this caustic alkaline solution is about 117.6 pounds. This amount does not provide for an excess of caustic, and an additional amount may be added if the neutralization of the free fatty acids has not been completely effected. The mixture is then heated to a moderate temperature (50°–65° C.) to coagulate the soap-stock as much as possible, as in general practice. An amount of powdered bentonite is then added to complete coagulation, about equal to 2% by weight of the crude oil, and the mass is agitated for about 15 to 20 minutes, after which the mass is permitted to stand until the settling takes place, after which the neutral oil is separated by decanting it. The settled coagulant and soap may be filtered, centrifuged, or otherwise treated, for recovery of neutral oil, if desired.

As I have already indicated, while the preliminary acid treatment and the coagulation of soap stock by means of bentonite may both be followed in the refinement of a batch of edible oil, yet one is not necessarily dependent upon the other. Thus bentonite may be employed with oil which has been treated only with lye, and some other coagulant may be used with the oil which has been acid treated.

In using sulphuric acid for decolorizing dark colored oils, the strength of the acid preferably should not exceed 75% $H_2SO_4$ by weight, as sulphuric acid up to this strength can be used without injury to the neutral triglycerides of the oil. The acid has not only remarkable decolorizing properties for dark-colored oils when used in the vicinity of 70% $H_2SO_4$ by weight, but also improves them for the usual hydrogenization process. The catalyst in the hydrogenization process has apparently a greater activity than when used with the oil as ordinarily refined without the acid treatment. A further advantage resulting from the acid treatment is that the soap, subsequently formed in the subsequent treatment of the oil with caustic alkali, is often more granular and occupies less volume. This result is secured with an acid of 30% $H_2SO_4$ by weight, although the latter is apparently too weak to decolorize the crude oil. The strength of the acid, according to the results desired to be secured, may range from 30% to 75% $H_2SO_4$ by weight, the best results for decolorizing and purifying the oil being secured by a strength of acid of 45% to 75% $H_2SO_4$ by weight. When a relatively large amount, say, 0.15% of the higher strength (75%) acid is employed, the subsequent bentonite treatment is of especial advantage, for the soap formed by the alkali treatment is more finely divided and (though more difficult to coagulate by the usual coagulants) is caused quickly to settle for its removal.

When the bentonite is used as the coagulant with an alkali-treated oil, which has not been subjected to the acid pretreatment, an amount not exceeding in weight 2% of the weight of the crude oil is usually sufficient for oils containing up to 5% free fatty acids. When the free fatty acid content is higher, an amount of bentonite equal to one-half of the weight of the caustic lye is sufficient, whereas, with crude oils of low acidity say up to 2%, an amount of bentonite equal to the weight of the caustic lye usually suffices.

When the oil is pretreated and decolorized with sulphuric acid, cautsic lye should be used in sufficient amount to neutralize both the mineral acid and the free fatty acids. A caustic soda solution ranging from about 10° Bé. to about 24° Bé. may be used.

Attention may be called to the fact that the use of bentonite possesses advantages over that of commercial sodium silicate as a coagulant, since the latter is strongly alkaline and causes an additional quantity of soap to be formed from the neutral glycerides, if in the caustic treatment sufficient caustic is added to neutralize the free fatty acids, and is inefficient in taking up and readily coagulating the finely divided soap,—whereas bentonite though of an alkaline nature does not react with the glycerides, nor will it form jelly-like masses as sodium silicate does under certain conditions. Furthermore bentonite has a greater absorptive power than fuller's earth (which has acidic properties), and has a greater power of settling and compacting the soap and other impurities than diatomaceous earth. Moreover bentonite dehydrates the oil in addition to removing the finely divided soap stock from suspension and compacting the precipitated layer thereof. Of the bentonites, that known as ardmorite is particularly of value in carrying out my process as it settles more quickly than others.

By the term "bentonite" as employed in the appended claims, I mean to include certain other equivalent hydrophilic earths, such as "ardmorite", which, like bentonite, are characterized by an alkaline earth or alkaline earth oxide content and by their capacity of absorbing several times their weight of water and of decolorizing edible oils without affecting neutral glycerides.

What I claim is:—

1. That step in decolorizing and refining edible oils and fats which consists in subjecting such oils to the action of from 0.05% to 0.15% of sulphuric acid solution of 30% to 75% by weight of $H_2SO_4$.

2. A process of refining an edible oil, which comprises treating such oil with 0.05% to 0.15% of a solution of 30% to 75% by weight of $H_2SO_4$, then treating it with sufficient lye to neutralize the sulphuric acid and the free fatty acids of the oil, adding a powdered mineral earth to coagulate the soap stock formed by neutralization, and removing the coagulated product from the oil.

3. A process of refining an edible oil, which comprises treating the oil with 0.05% to 0.15% of a solution of 30% to 75% by weight sulphuric acid, neutralizing the sulphuric acid and also the free fatty acid content of such oil, adding sufficient bentonite to coagulate the neutralized impurities, and removing the coagulated impurities from the oil.

4. A process of refining an edible oil, which comprises treating such oil with 0.05% to 0.15% of a solution of 30% to 75% by weight of $H_2SO_4$, neutralizing the inorganic and organic acid content of the oil, heating the oil, adding sufficient powdered bentonite to coagulate impurities and agitating the mixture and separating the oil from the coagulated impurities.

5. A process of refining an edible oil, which comprises treating such oil with 0.05% to 0.15% of a solution of 30% to 75% by weight of $H_2SO_4$, neutralizing the inorganic and organic acid content of the oil, heating the oil to about 50° to 65° C., adding about 2% powdered bentonite based upon the weight of the oil to coagulate impurities and agitating the mixture, allowing settling of the coagulated impurities to take place, and decanting the oil from the settled impurities.

In testimony whereof I have affixed my signature.

ROGER B. HILL.